United States Patent
Schneider et al.

(10) Patent No.: US 9,238,313 B2
(45) Date of Patent: Jan. 19, 2016

(54) APPARATUS, MOLD AND METHOD FOR PRODUCING SHAPED ARTICLES FROM A UV-CURABLE COMPOSITION

(71) Applicant: ABB RESEARCH LTD, Zürich (CH)

(72) Inventors: Marco Schneider, Baden (CH); Patrick Meier, Staufen (CH); Xavier Kornmann, Lauchringen (DE)

(73) Assignee: ABB RESEARCH LTD, Zürich (CH)

( * ) Notice: Subject to any disclaimer, the term of this patent is extended or adjusted under 35 U.S.C. 154(b) by 510 days.

(21) Appl. No.: 13/685,142

(22) Filed: Nov. 26, 2012

(65) Prior Publication Data

US 2013/0134636 A1    May 30, 2013

(30) Foreign Application Priority Data

Nov. 24, 2011  (EP) .................................. 11190600

(51) Int. Cl.
| | |
|---|---|
| *B29C 33/38* | (2006.01) |
| *B29C 35/08* | (2006.01) |
| *B29C 39/26* | (2006.01) |
| *B29C 33/40* | (2006.01) |
| *H01B 3/46* | (2006.01) |
| *B29C 33/00* | (2006.01) |

(52) U.S. Cl.
CPC .............. *B29C 39/26* (2013.01); *B29C 33/40* (2013.01); *B29C 35/0888* (2013.01); *H01B 3/46* (2013.01); *B29C 2033/0005* (2013.01); *B29C 2035/0827* (2013.01)

(58) Field of Classification Search
CPC .. B29C 33/405; B29C 33/40; B29C 35/0888; B29C 2035/0827; B29C 2033/0005; B29C 33/3807; B29C 33/3929; B29C 2035/0833; B29C 35/0894
See application file for complete search history.

(56) References Cited

U.S. PATENT DOCUMENTS

| | | | |
|---|---|---|---|
| 4,898,912 A | 2/1990 | Siol et al. | |
| 4,906,696 A | 3/1990 | Fischer et al. | |
| 5,422,046 A * | 6/1995 | Tarshiani et al. | 264/1.38 |
| 5,885,514 A | 3/1999 | Tensor | |
| 5,916,509 A | 6/1999 | Durhman | |
| 5,942,168 A * | 8/1999 | Ichikawa et al. | 264/40.1 |
| 2008/0260981 A1* | 10/2008 | Mogi et al. | 428/36.8 |

(Continued)

FOREIGN PATENT DOCUMENTS

| | | |
|---|---|---|
| DE | 36 323 69 A1 | 3/1988 |
| DE | 37 192 39 A1 | 12/1988 |
| DE | 197 05 303 A1 | 1/1998 |

(Continued)

OTHER PUBLICATIONS

Search Report issued on May 3, 2012, by the European Patent Office for Application No. 11190600.4.

*Primary Examiner* — William Bell
(74) *Attorney, Agent, or Firm* — Buchanan Ingersoll & Rooney PC

(57) ABSTRACT

A mold for molding a UV cured article in an inner volume thereof, the mold including a mold wall surrounding the inner volume, the mold including a UV-transparent polymer and UV radiation deflecting particles immersed in or adhered to a surface of the mold wall. Also provided is an apparatus including the mold and a process for molding a UV cured article.

25 Claims, 1 Drawing Sheet

(56) References Cited

U.S. PATENT DOCUMENTS

Figure 1:
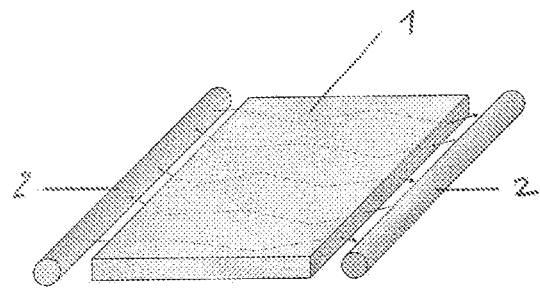

2009/0130471 A1* 5/2009 Saga .................... 428/477.7
2009/0302507 A1* 12/2009 Tsunozaki et al. ............ 264/496

FOREIGN PATENT DOCUMENTS

| DE | 10 2010 002141 A | 8/2011 |
| EP | 1927621 A1 * | 6/2008 |
| JP | 59-215838 A | 12/1984 |
| JP | 60-124238 A | 7/1985 |
| JP | 7-178754 A | 7/1995 |
| WO | WO 2006/010763 A1 | 2/2006 |
| WO | WO 2009/027133 A2 | 3/2009 |
| WO | WO 2011/085880 A1 | 7/2011 |

* cited by examiner

APPARATUS, MOLD AND METHOD FOR PRODUCING SHAPED ARTICLES FROM A UV-CURABLE COMPOSITION

RELATED APPLICATION(S)

This application claims priority under 35 U.S.C. §119 to European Patent Application No. 11190600.4 filed in Europe on Nov. 24, 2011, the entire content of which is hereby incorporated by reference in its entirety.

FIELD

Disclosed is an apparatus, a mold and a method for manufacturing plastic resin components. Disclosed is an apparatus, a mold and a method of molding plastic resins using ultraviolet ("UV") cure technology. Also disclosed is an apparatus, a mold and a method for producing shaped articles from an ultraviolet light curable silicone rubber composition using a UV-transparent mold, and curing said UV-curable silicone rubber composition within the thermoformed UV-transparent mold which exhibits UV radiation deflecting properties with a UV-light source. Said shaped articles can be electrical insulators for indoor and outdoor use, for example, high voltage electrical insulators. Said thermoformed UV-transparent mold can be made from a thermoplastic UV-transparent polymer, and can be made from a thermoplastic UV-transparent and UV-stable polymer. Said UV radiation deflecting means are represented by foils or UV deflecting particles. Said UV-light source can be a UV-LED light source.

BACKGROUND INFORMATION

Molding methods include those which involve injection molding and extrusion methods where a polymer is heated to a plastic state, then formed in a mold or die, then cooled to form a finished product. As such, the mold is made from a substrate that is able to withstand these pressure and temperature changes. Often, molds are made of high strength steels and are expensive to produce.

For the solution of these problems, UV curing methods have been proposed in the last four decades. According to these methods, ultraviolet radiation is applied to resins such as coatings, adhesives, marking ink and photo-resists, and photocurable substances etc., to cause photo polymerization. UV curing methods can show inter alia the following advantages: i) in the curing reaction, a liquid monomer changes to a solid polymer within a few seconds, ii) since the entire material is basically cured by solvent-free photo polymerization, it can be very effective to fulfil the requirements of environment-related regulations and orders such as PRTR (Pollutant Release and Transfer Register) Law or ISO 14000, iii) the UV curable material does not cure unless exposed to light and, unlike heat-curable material, it does not get cured gradually during preservation, hence, its pot-life is short enough for it to be used in automation processes, iv) a great number of resins are available for use in such UV-curing processes.

However, regarding the manufacture of articles having a more or less complex shape, the following problems can arise.

The resins can be characterized in that they are cured only in regions which are exposed to more than a certain amount of energy radiation. On the other hand, energy radiation typified by UV radiation can be characterized in that it is attenuated while it passes through a resin. As a result, it can be either difficult for energy radiation to penetrate the resin deep enough and at every location, or energy radiation is greatly attenuated or absorbed. Thus, photo-curable resins are cured only in a surface layer having a thickness of several micrometers to several millimeters through which energy radiation can pass, and the deep part and the parts which cannot be reached by the radiation which is emitted in a linear manner from the UV-source remain uncured. Consequently, it can be difficult or partially impossible to apply photo-curable resins to thick-walled materials and/or having a more or less complex shape.

Thus, it is not surprising that UV cure resins have in fact been used to form coatings and adhesives, but they have not generally been used in molding applications. This can, inter alia, be seen from the following examples.

U.S. Pat. No. 5,916,509 entitled "Actinic irradiation and curing of plastic composites within a material forming die" states that uncured thermoset composite reactants containing ultraviolet curable reagents may be effectively cured by pultrusion using a unique molding die, which uniformly irradiates the uncured composites contained within the die.

DE Patent Document No. 197 05 303 entitled "Production of small and micro parts" is concerned with the production of small and micro-parts made of a molding composition and which comprises: (a) evacuating the mold with integrated mold insert; (b) placing the molding composition into the mold under pressure where a low viscosity molding composition is used, which contains a component hardenable by short wave light; (c) irradiating with short wave light while maintaining a post pressure to completely harden the composition; and (d) opening the mold and removing the molding.

In U.S. Pat. No. 5,885,514 entitled "Ambient UV-L-curable elastomer mold apparatus," a process for molding parts such as gaskets using an injection molding machine is described. According to this document, the molding machine includes upper and lower mold plates, which are transparent to UV light, have pattern recesses of differing sizes, a UV light source, a low pressure injection system for delivering elastomers to the mold plates and are located spaced apart from one another.

In a molding apparatus according to JP Patent Document No. 59215838, an ultraviolet ray hardening molding material is injected into a die from an injection molding machine to fill the space in a cavity core. Then ultraviolet rays irradiate the cavity and the cavity core separately via an optical fiber from an ultraviolet ray irradiation source.

SUMMARY

According to an exemplary aspect, disclosed is a mold for molding a UV cured article in an inner volume thereof, the mold comprising a mold wall surrounding the inner volume, the mold comprising a UV-transparent polymer and UV radiation deflecting particles immersed in or adhered to a surface of the mold wall.

According to an exemplary aspect, disclosed is an apparatus for molding a UV cured article, the apparatus comprising: an exemplary mold, and a UV light source attached to a UV light source connection region of the mold wall.

According to an exemplary aspect, disclosed is a method of molding a UV cured article, the method comprising: providing an exemplary mold; filling a UV curable mass into the inner volume; emitting UV light from a UV light source through the mold wall; deflecting the UV light by the UV light deflecting particles; irradiating the UV curable mass with the UV light, thereby curing the UV curable mass to become the UV cured article.

According to an exemplary aspect, disclosed is a method of manufacturing an article, the method comprising: providing an exemplary mold; filling a UV curable mass into the inner volume; and irradiating the UV curable mass with the UV light, thereby curing the UV curable mass to become the UV cured article.

BRIEF DESCRIPTION OF THE DRAWNIGS

Exemplary aspects and features are described in the following detailed description in conjunction with the accompanying drawings.

FIG. 1 illustrates a part of the wall 1 of the mold which is made from a comparative UV transparent material. The tubes 2 symbolize the UV sources and the arrows indicate the UV light propagation in the UV transparent material.

Figure 2:
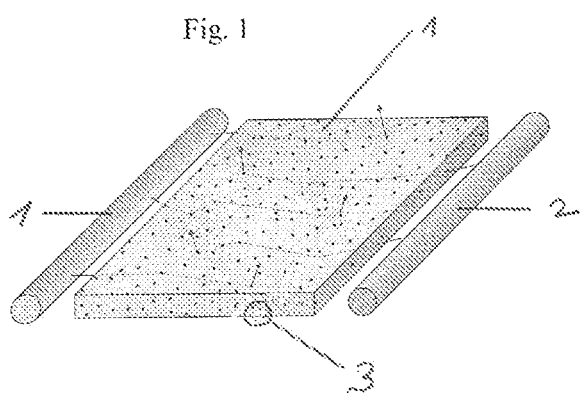

FIG. 2 illustrates a part of the wall 1 of the mold which is made from UV transparent material containing particles that are deflecting the UV light in perpendicular direction, according to an exemplary aspect. The tubes 2 symbolize the UV sources and the arrows indicate the UV light propagation in the UV transparent material which contains the UV radiation deflecting particles 3.

Figure 3:
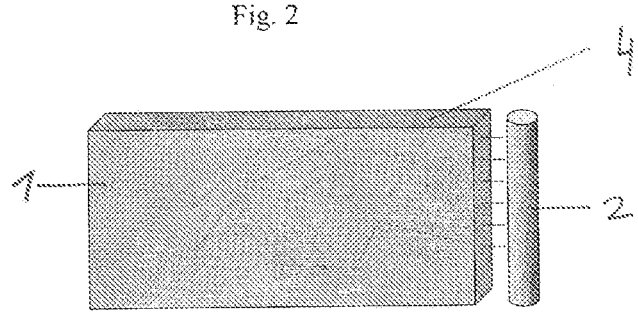

FIG. 3 illustrates a part of the wall 1 of the mold which is covered with a reflective UV light layer 4 to guide the UV light in a specific direction, according to an exemplary aspect. The tube 2 symbolizes the UV sources and the arrows indicate the UV light propagation in the UV transparent material.

DETAILED DESCRIPTION

According to an exemplary aspect, provided is an apparatus and a method for manufacturing molded articles using UV-radiation based curing systems. According to an exemplary aspect, provided are substantial improvements in manufacturing molded articles and decreasing energy consumption; allowing use of lower cost mold materials; reducing material waste; and providing greater manufacturing flexibility. According to an exemplary aspect, provided is a process for the manufacture of molded articles of high efficiency. According to an exemplary aspect, provided is a process for the manufacture of molded articles of high efficiency for use in the electro-technical industry.

It is possible, for example, to produce UV-cured shaped thick-walled articles and/or articles having complex shape molds which exhibit UV radiation reflecting means.

In an exemplary embodiment, an apparatus is formed of a mold which comprises only one or a plurality of mold segments that can be fitted together to form the mold and separated from each other to release a manufactured product from the mold. These molds or at least parts or portions thereof are manufactured from sheet material, also known as semi-finished, planar sheet products having a constant thickness. According to an exemplary embodiment, the sheet material contains UV radiation deflecting particles. According to an exemplary embodiment, the sheet is provided with at least one coating containing UV radiation deflecting particles or with a UV deflecting foil before or after the shaping of the sheet material. In other words, the UV radiation deflecting particles can be (i) incorporated into the mold wall; (ii) positioned on the outside of the mold wall; (iii) positioned on the inside of the mold wall.

The sheet material can be transformed into the desired shape, e.g., by machining, thermoforming and/or assembling, such that its interior contour is the negative or the positive of the form of the article to be shaped with the molds. Depending on the complexity and the cross-section of the article to be shaped by the molds, a single mold, two halve-molds that are matching one another or multi-part molds comprising several mold portions can be employed.

The design of the mold and cavity can allow for direct illumination of the UV curable material and the UV radiation deflecting particles or the UV deflecting foil or layer containing the UV deflecting particles by the UV light source. This may be achieved by various means, such as providing an opening in the upper end of the mold to direct UV light into the mold cavity, so long as the light entering from the opening exposes all of the interior surfaces of the mold.

For example, provided are molds that are substantially made from thermoplastic UV-transparent and UV-stable polymeric sheet materials. The wall thickness of such molds can vary between about 1 mm to 50 mm, depending on the size of the article to be shaped and the amount of the UV curable composition, e.g., a UV curable silicone rubber composition, to be supported. The wall thickness can be sufficient to reduce or prevent deformation of the molds or mold portions for the article to be shaped by the molds. Expressed differently, molds having a wall thickness of more than 1 mm can carry heavier weight fillings of the UV curable composition than molds having a wall thickness of 1 mm only.

Using thermoformed thermoplastic UV radiation deflecting molds can allow the production of voluminous articles having a more or less complex structure on industrial scale. This can render the production of UV-cured shaped articles made from UV-curable silicone rubber compositions considerably cheaper. The method can allow the manufacture of large molds which have UV radiation deflecting properties and which cannot be manufactured by other means, such as by machining or injection molding techniques. This can be of interest for the manufacture of large articles such as, for example, electrical insulators like hollow core insulators.

According to exemplary aspects, disclosed are an apparatus, a mold and a method of producing shaped articles from UV-curable compositions, for example, from silicone rubber compositions by irradiating said UV-curable silicone rubber composition with UV-light.

Molds that are made from a UV-transparent material and which deflect ultraviolet radiation are provided herein. The compositions, which can be thermoplastic, comprise a suitable thermoplastic material as described above and particles of UV deflective material. The composition and configuration of the thermoplastic composition and the UV deflective material can be selected to provide a composition with desired levels of UV deflectivity, and durability for a desired application. The composition is can be resistant to degradation upon exposure to UV radiation (UV-stable) for at least a desired period of time. For example, the total mass of the UV-stable material is at least 60% by weight, for example, at least 85%, for example, at least 95% by weight of the composition. Beside the deflecting particles, additional materials may be optionally present in the composition such as, for example, additives or crosslinkers etc.

The UV light transmitting plate or block may be either machined, thermoformed or assembled in order to build a mold. According to an exemplary embodiment, the mold is formed of a plurality of mold segments that can be fitted together to form the mold and separated from each other to release a manufactured product from the mold.

Thermoplastic polymers that are UV-transparent and UV-stable are commercially available and can be employed. As used herein, the term "thermoplastic material" or "thermoplastic polymer" is intended to mean a polymeric material that softens or melts on heating and becomes rigid again on cooling. Thermoplastic polymers can exhibit either crystalline or semi-crystalline morphology upon cooling after meltformation through the use of a mold or like article. The thermoplastic material can be selected or adapted to provide a desired level of resistivity to degradation upon exposure to UV radiation. For example, the thermoplastic composition is a polymethacrylate homopolymer. Commercially available polymers which can be used for the production of molds include, for example, UV-transparent and UV-stable, for example, UV-transparent engineering plastics, for example: polyurethane (PU), polymethylmethacrylate (PMMA); polyvinylchloride (PVC); cyclo-olefin-polymers (COP) as commercially available under the trade names ZEONE®, or ZEONOR®; polymethylacryl-methylimide-polymers (PMMI); polycarbonate (PC); polyethylene-terephthalate (PET); styrene-acrylonitrile polymers (SAN); polysulfone polymers (PSU); polymethacrylimide polymers (PMI); polypropylene (PP); polystyrene (PS). Exemplary are polyurethane (PU), polymethylmethacrylate (PMMA); polyvinylchloride (PVC); cyclo-olefine-polymers (COP); polymethylacryl-methylimide-polymers (PMMI); polycarbonate (PC); and poly-ethylene-terephthalate (PET). Exemplary is polymethylmethacrylate (PMMA) commercially available under the name PLEXIGLAS®.

A UV-transparent thermoplastic polymer that can be used is a polymer with a UV-transparency of at least 30%, for example, at least 60%, for example, at least 80%, for example, at least 90%, for example with 60% UV-transparency in a wavelength range of the UV spectrum of the material of about 360 nm to 380 nm. If other transparencies are selected, the wavelength can be adjusted accordingly.

The wall thickness of the mold, i.e., the UV transparent mold wall, can vary between about 1 mm and 50 mm, giving the possibility to manufacture either flexible or rigid transparent molds. Accordingly, in an exemplary embodiment, the wall thickness of the mold is within the range of about 1.0 mm to about 50 mm, for example, higher than 1 mm, for example, within the range of about 2.0 mm to about 30 mm, for example, within the range of about 2.0 mm to about 15 mm, for example, within the range of about 2.0 mm to about 10 mm. According to an exemplary feature of the mold, the wall has a thickness in the range of 1 to 50 mm, and/or wherein the inner volume accommodates a spherical sub-volume with a diameter of 1 cm.

A thickness that is within the indicated range can be enough to provide a mold that is durable for multiple mold cycles and to carry heavier weights. The wall thickness can be selected such that the sheet material can be heated up for conducting the thermoforming process in order to create the negative or positive form of the article to be shaped.

The UV deflecting or reflecting means can be represented by UV radiation deflecting particles which are located respectively dispersed in the transparent material of the mold, or by a UV-deflecting layer of such particles, or a foil on the outer or inner side of the mold wall containing these particles which direct the UV light in the proximal (inner) direction of the mold. The expression "deflecting particle" or "UV radiation deflecting particle" can stand for a particle which diverts the direction of a UV-ray (including scattering and reflection).

The UV deflective material can be aluminum, although other UV deflective materials, such as stainless steel, or non-metallic materials such as oxides of metals, for example, magnesium oxide or alumina, or oxides of metalloids, such as silica, or salts of elements of the first, second or third main group of the periodic table of elements, for example, halogenides of the metals of the first, second or third main group of the periodic system of elements, for example, fluorides of the metals of the first, second or third main group of the periodic system of elements, for example, magnesium fluoride, calcium fluoride, lithium fluoride and or deflective polymer materials or combinations of two or more UV deflective materials, can be used.

The particles of UV deflective material can have any size suitable to provide the desired level of UV deflectivity, and can be microparticles, such as microparticles having an average size of about 1 to 100 µm, or more, for example, about 15 µm to about 55 µm.

According to an exemplary embodiment, the UV radiation deflecting particles have a total scattering cross section of at least 1%, for example, at least 10% of a corresponding cross-sectional area of the mold wall.

The thermoplastic composition can comprise any amount of the UV deflective material to provide the desired level of UV deflectivity, for example, the composition can comprise from about 0.0001 to about 5% by weight of the UV deflective particles.

Various UV reflective compositions having desired levels of UV reflectivity can be formulated using combinations of UV reflective microparticles of different sizes and concentrations. Larger particles and/or higher concentrations of UV reflective material can provide higher levels of UV reflectivity; smaller particles and lower concentrations of UV reflective material can provide lower levels of UV reflectivity. An increase in the surface area to volume ratio of the UV reflective material may account, at least in part, for the increased UV reflectance of the smaller particles. For example, a thermoplastic composition comprising 1.00% aluminum microparticles having an average size of 17 µm in a polypropylene homopolymer thermoplastic material may have a reflectivity of up to about 40%, or higher, of UV radiation at a wavelength of 254 nm.

However, it can be desirable for the contact of the UV deflective thermoplastic composition with the curable composition for a period of time, desired to harden the curable composition, to not result in the migration of an undesirable level of UV radiation deflecting particles or impurities from the thermoplastic composition to the fluid or partially cured composition.

Any density of particles of UV deflective material can be included in a thermoplastic material that provides a thermoplastic composition with a desired level of UV deflectivity. The density of particles of UV deflective materials can be high enough to provide a desired level of UV deflectivity to a thermoplastic composition, without undesirably affecting the machine processibility of a thermoplastic composition. For example, concentrations of abrasive UV deflective materials, such as metallic UV deflective metals, of about 5% or more may cause damage to machining surfaces. Therefore, the density of metallic UV deflective materials in the thermoplastic composition can be less than about 5% by weight, for example, less than 4% by weight, for example, less than 2% by weight. To provide adequate levels of UV deflectivity, the density, for example, of metallic UV deflective material can be at least 0.25%, for example, at least 0.50% by weight.

Various UV deflective compositions having desired levels of UV deflectivity can be formulated using combinations of UV deflective microparticles of different sizes and concentrations. Larger particles and/or higher concentrations of UV deflective material can provide higher levels of UV deflectivity; smaller particles and lower concentrations of UV deflective material can provide lower levels of UV deflectivity. An increase in the surface area to volume ratio of the UV deflective material may account, at least in part, for the increased UV deflectance of the smaller particles. For example, a thermoplastic composition comprising 1.00% aluminium microparticles having an average size of 17 µm in a polypropylene homopolymer thermoplastic material may have a reflectivity of up to about 40%, or higher, of UV radiation at a wavelength of 254 nm. For example, a thermoplastic composition comprising 1.50% aluminium microparticles having an average size of 54 μm in a polypropylene homopolymer thermoplastic material may also have a reflectivity of up to about 40%, or higher, of UV radiation at a wavelength of 254 nm. UV deflective compositions can have a UV reflectance at 254 nm of at least about 30%.

According to an exemplary embodiment, the mold wall has a linearly extending UV light source connection region having, for example, an aspect ratio of at least 5:1, for example, at least 10:1, for attaching a UV light source thereto. The UV-rays, which are generated by the UV light source, penetrate into the mold wall and propagate to the inner volume of the mold which is enclosed by the mold wall. During the propagation through the wall, at least a part the UV-rays is deflected/scattered or reflected. In an exemplary embodiment, the inner volume is irradiated in an anisotropic manner, for example, at a rate of anisotropy of less than 50%, (i.e., the UV light intensities which are measured at a center of the inner volume from two arbitrary different directions differ in intensity by less than 50% of the larger intensity and the UV light intensities being averaged over an angular area of at least 5° in every angular direction).

According to an exemplary aspect, molds/moldings which comprise a glass-clear matrix plastic and organic plastic particles which are distributed therein and which have a so-called core-shell morphology can be suitable for providing a solution to problems. The core of the plastic particles can be crosslinked and the shell is at least partly bonded to the core, and the shell material is miscible with the matrix plastic.

The refractive index of the core material of the plastic particles can differ by 0.06 to 0.4 from the refractive index of the matrix plastic. Furthermore, the diameter of the core of the plastic particles can be <0.2 μm and the proportion of the plastic particles, based on the matrix plastic, can account for 0.0001 to 5% by weight. The refractive index difference between the core of the scattering particles and the matrix plastic is the range of 0.09 to 0.3.

According to another exemplary embodiment, the proportion of the plastic particles lies in the range of 0.001 to 0.2% by weight, based on the matrix plastic.

Two different types of exemplary moldings are described below.

In an exemplary embodiment, a first type of moldings are suitable which exhibit a matrix of polyacrylate and polymethacrylate (PMMA) and which are composed of >90% by weight of esters of acrylic acid and methacrylic acid (MMA) ($n_D20=1.49$).

Plastic particles which are combined with a PMMA matrix contain cores which exhibit a refractive index of >1.57. These particles can be obtained by copolymerization of styrene with crosslinking agents.

Furthermore, monomers containing other aromatic groups are also suitable, for example vinylnaphthalene. In this case of a PMMA matrix, PMMA itself, which is at least partly bonded to the core, is suitable as the shell material of the particles.

In an exemplary embodiment, a second type of moldings which can be used are moldings which exhibit a matrix which is made of polystyrene, bisphenol polycarbonate, e.g., bisphenol A polycarbonate, or aromatic polyesters, such as polyesters of alkylidene terephthalate. In this case, the shell material of the plastic particles contains vinyl polymers which are compatible with said matrix polymers. For example, copolymers of 60 parts (by weight) of MMA and 40 parts (by weight) of cyclohexyl methacrylate, for example, which are disclosed in DE 36 323 69, or polystyrene itself is suitable as the shell material for a matrix of polystyrene.

Amongst others, for example, a copolymer of MMA and phenyl methacrylate, which is compatible with this polycarbonate, is suitable as the shell material for the plastic particles for mixing with bisphenol A polycarbonate, as it is disclosed in DE 37 192 39. According to an exemplary embodiment, copolymers of styrene and MMA are also suitable for the use as shell materials. These shell materials can also be used for a plastic matrix of aromatic polyesters.

In the case of an aromatic plastic matrix which has a comparatively high refractive index, e.g., $n_D20>1.57$, cores of the polymer particles having as low a refractive index as possible can be chosen. For example, crosslinked PMMA ($n_D20=1.49$), crosslinked polybutyl acrylate ($n_D20=1.466$) and furthermore, cores based on partly fluorinated (meth)acrylates are suitable as core materials in this case.

The plastic particles can be so-called core-shell particles, which are readily obtainable through emulsion polymerization (see, for example, DE 198 20 302). For example, these plastic particles can contain two different polymers having correspondingly different functions.

With regards to the deflecting/scattering function, the core can be substantially characterized by the difference in the refractive index from the matrix material Δn and by the size. Δn is in the range 0.06 to 0.4, for example, in the range of 0.09 to 0.3. As a rule, the cores are spherical particles, which have a diameter in the range of 0.02 to 0.2 μm, for example, in the range of 0.04 to 0.15 μm. Cores of the plastic particles for mixing with the matrix plastic poly(meth)acrylate comprise as a rule >60% by weight, for example, >90% by weight of styrene or other aromatic vinyl monomers and 0.01 to 30% by weight, for example, 0.05 to 5% by weight, of polyfunctional vinyl compounds (crosslinking agents) such as, for example divinylbenzene or ethylene di methacrylate.

The concomitant use of a small proportion, e.g., 0.01 to 10% by weight, of crosslinking agents which exhibit 2 polymerizable groups of different reactivity (graft-linking agents), e.g., allyl methacrylate, is exemplary.

The shell of the plastic particles for mixing with PMMA can comprise MMA and small proportions, e.g., 4% by weight, of $C_1$-$C_4$-alkyl esters of acrylic acid.

If plastic particles having a core with a high refractive index are used for mixing with the plastic matrix (PMMA), plastic particles which have a low refractive index, $n_D20$ e.g. <1.50, can be chosen for mixing with the more highly refractive aromatic matrix plastics. Suitable core materials of the plastic particles are obtained, for example, by copolymerization of >80 parts of MMA, 1 to 19 parts of acrylates, such as ethyl acrylate, and 0.1 to 10 parts of crosslinking agents, such as butanediol diacrylate.

As described above, vinyl polymers which are compatible with the plastic matrix can be used as shell material. Accordingly, a shell material comprising 90 parts of MMA and 10 parts of phenyl methacrylate can be used (see DE 37 192 39).

In general, the weight ratio of core to shell can be in the range of 3:1 to 1:10, for example, in the range of 2:1 to 1:5.

The core of the plastic particles is crosslinked and dimensionally stable. Exemplary are cores which have a glass transition temperature of >60° C. Any suitable technique for the manufacture of molds/moldings comprising a plastic matrix and plastic particles can be employed (see, for example, WO 2007/025864, page 6, line 15 to page 7, line 30).

The UV deflective material can be combined with the thermoplastic material by any suitable process. For example, a suitable thermoplastic composition can be formulated by a commercial vendor, such as modified versions of polymer-metal composites sold by Poly One (Northbrook, Ill.) under the trade name GRAVITEC. The UV-transparent material can be selected from any material, for example, a thermoplastic material, having a desired level of resistance to degradation from exposure to UV radiation.

UV-light sources producing UV-light can be used and include, for example, xenon lamps, mercury lamps and mercury lamps doped with iron or gallium, black-light lamps, excimer lasers and UV-LED lamps.

The UV-light source may be provided, for example, by an arcing UV-lamp, or by a microwave powered UV-lamp or by an LED UV-lamp. An advantage of an LED UV-lamp over the two other types of UV-lamps is the fact that an LED UV-lamp irradiates within a specific wavelength area. In this way, a significantly lower amount of heat is generated during UV-irradiation. Therefore, LED UV-lamps can work with transparent organic molds.

Exemplary is a light source based on the UV-LED technique, for example, in the form of the Semiconductor Light Matrix (SLM), as closed packed LED's. Such a light source is simple to install, is safe to use and energy efficient, and has a long service life with practically no maintenance costs. UV-LED sources further have a high UV-light intensity and give good curing results, for example, when comparing cure depth versus distance of the UV-light source and irradiation time, for UV-curing UV-LSR compositions. UV-LED sources can generally give better results than comparative halogen UV-sources, as the UV-intensity of UV-LED sources can be generally higher than the UV-intensity of comparative halogen UV-sources. An example for a commercially available UV-lamp is the Phoseon water cooled UV-LED RX StarFire Max, with a wavelength of 365 nm and 395 nm with a stated output of 2 W/cm$^2$ or 4 W/cm$^2$.

The irradiation source can have power consumption within the range of 2 kW to 20 kW and may be applied at a distance of 1 cm to 100 cm, for example, at a distance of 1 cm to 10 cm. According to such an assembly the mold can function as a self illuminating mold.

The UV-light-irradiation intensity applied for UV-curing LSR can be within the range of 1 W/cm$^2$ to 4 W/cm$^2$, for example, within the range of 2 W/cm$^2$ to 4 W/cm$^2$, at a wave length as defined previously herein.

Exemplary UV-sources used for UV-curing different curable materials are mercury lamps and mercury lamps doped with iron or gallium. The UV-light emitted from these types of light sources covers a wide range of wave lengths. However, the shortest wave lengths can cause the formation of undesirable ozone waves and long wave light, which are partly within the infra-red range, and generate heat. Halogen lamps can possess short service lifes in the order of 1000 hours compared to tens of thousands hours for UV-LED lamps. Therefore, UV-LED lamps can be exemplary in comparison to mercury lamps.

UV-LED lamps may be suitably arranged for obtaining optimum results. LED-lamps of different lengths may be used to allow for optimized UV-curing by individually adjusting the number of UV-LED units and their intensity levels. A possible production set up for rotational symmetric products is to place the products to be UV-cured in an upright position, e.g., on a slowly rotating disc. Very short curing times may be obtained by using vertically positioned and adjustable UV-LED heads, e.g., three such heads uniformly spaced at 120 degrees angle, e.g., of the Phoseon RX StarFire Max type, with 365 nm wavelength, and optionally additional UV-spot lamps, e.g., of the Phoseon RX FireFlex type units, above and below the mold to allow for simultaneously irradiation of both outer and internal parts. In an exemplary embodiment, cure times in the order of 10 seconds are obtainable for thin walled products such as indoor cable terminations (SOT).

An exemplary UV light source is a UV lamp providing a UV intensity of about 115 mW/cm$^2$ at 365 nm. The UV light source can desirably provide a broad range of wavelengths from 250-500 nm, which will cure materials much faster than if only the 365 nm radiation was delivered.

In an exemplary embodiment, the UV curable material transmits UV light, and therefore, is not opaque. The UV curable material may be pigmented or tinted. The UV curable material can be selected from a number of different UV curable polymer systems. A UV curable polymer system can comprise 1-3% of a photoinitiators; 15-60% of reactive diluents, 25%-90% of an oligomer polymer; and 1-50% of additives and fillers. Polymers used in UV curable polymer systems can include polyurethanes, epoxies, polyesters and acrylates. Specific commonly used monomers for the polymer include N-vinylpyrrolidone, hydroxyethyl acrylate, (poly)ethylene glycol diacrylate, trimethylolpropane triacrylate, norbornyl acrylate, and styrene. Another suitable polymer system is the thiol-ene polymer system (also known as mercaptoesters). Commercially available UV curable polymer systems include products from Master Bond, Inc., Hackensack, N.J., Tangent Industries, Winsted, Conn.; Daicel Chemical Industries, Ltd., Sakai Osaka Japan, and Ctech LLC, New Hartford, Conn. A suitable thiol-ene polymer system is available from Ctech, LLC. An exemplary UV curable liquid is a product that, when cured, will have good optical qualities, as this can be indicative of the finish and look desired in the method. These products can be cured at ambient temperatures, or at temperatures at or below 100° C. using a UV light source. Exemplary cure times range from 5 seconds to 5 minutes depending upon the wave length and intensity of the UV light and the thickness being cured.

The UV-curable composition may contain sensitizers and/or photo initiators such as compounds derived from anthracene, xanthonone, anthrachinone. Such compounds and their uses as sensitizers and/or photo initiators are commercially available.

One exemplary UV curable liquid is an acrylate formulation. One commercially available formulation that could be used is the Ctech 8166-4A formulation, which can be cured to a tack free surface with 5 minutes UV exposure at 100° C.

Another exemplary UV curable liquid is the thiol-ene polymer system. One commercially available formulation that can be used is the Ctech Hard Dome Coat formulation, which can be cured at a lower intensity UV light in the range of 30 mW/cm$^2$ with 5 minutes UV exposure at 100° C.

For example, with regard to electro technical applications, examples include RTV-SR and LSR compositions, a curable silicone rubber composition which is generally composed of two components, namely a first component comprising at least one polysiloxane having alkenyl groups, such as vinyl groups, incorporated in the molecule, and a second component comprising at least one polysiloxane having =SiH-groups incorporated in the molecule. These two components are mixed, filled into a mold and cured in the presence of a catalyst, e.g., a UV sensitive cross-linking catalyst. Such UV-curable silicone rubber compositions being curable in the presence of UV-radiation are are described, for example, in WO 2006/010763 A1 and WO 2009/027133 A2, the contents of which are incorporated by reference herein.

The UV-curable silicone rubber composition may also contain sensitizers and/or photoinitiators as mentioned above.

For example, UV-curable silicone rubber compositions cure very fast under the influence of UV-light, even for large thicknesses of several centimeters. This can be relevant as the curing time plays a significant role in the production and cycle time of such products.

An exemplary method of manufacturing molded articles comprises providing a mold or die at least substantially enclosing a cavity therein, filling the mold or die with a UV curable material, and exposing the UV curable material to a UV light source of a sufficient intensity, and for a sufficient time to cure said UV curable material to a solid mass contained in said mold or die.

An exemplary method of manufacturing molded articles comprises:
i) providing a mold or die at least substantially enclosing a cavity therein, the mold or die having means for deflection of UV radiation divergently into the cavity of the mold or die;
ii) filling the mold or die with a UV curable material;
iii) emitting UV light from a UV light source through the mold wall;
iv) deflecting the UV light, for example, at least 70% of the UV-light by the UV light deflecting particles; and
v) irradiating the UV curable mass with the UV light, thereby curing the UV curable mass to become the UV cured article.

According to an exemplary embodiment, provide is the use of the mold for the manufacture of a shaped article, for example, of an electrical insulator.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A mold for molding a UV cured article in an inner volume thereof, the mold comprising a mold wall surrounding the inner volume, the mold comprising a UV-transparent polymer and UV radiation deflecting particles immersed in or adhered to a surface of the mold wall,
wherein said UV-transparent polymer forms a matrix plastic and the UV radiation deflecting particles comprise plastic particles, which have a core-shell morphology and which are distributed in the matrix plastic;
wherein the core of the plastic particles is crosslinked, and the shell of the plastic particles is at least partly bonded to the core of the plastic particles and the shell of the plastic particles is miscible with the matrix plastic;
wherein the refractive index of the core of the plastic particles differs by 0.06 to 0.4 from the refractive index of the matrix plastic;
wherein the diameter of the core of the plastic particles is less than 0.2 µm, and wherein a proportion of the plastic particles, based on the matrix plastic, is 0.0001 to 5% by weight.

2. The mold according to claim 1, wherein said UV-transparent polymer is selected from the group consisting of a polyurethane, polymethylmethacrylate, polyvinylchloride, cyclo-olefine polymers, polymethylacryl-methylimide polymers, polycarbonate, polyethylene-terephthalate, styrene-acrylonitrile polymers, polysulfone polymers, polymethacrylimide polymers, polypropylene and polystyrene.

3. The mold according to claim 1, wherein said UV-transparent polymer has a UV-transparency of at least 30%.

4. The mold according to claim 1, wherein the size of said UV radiation deflecting particles is in a range of from 1 to 100 µm.

5. The mold according to claim 1, wherein the total mass of said UV radiation deflecting particles is more than 0.25 weight % of the polymer.

6. The mold according to claim 1, wherein said UV radiation deflecting particles further comprise at least one of the following:
(i) a metal;
(ii) a metal oxide or an oxide of a metalloid; or
(iii) a salt of an element of groups I, II or III of the periodic table of elements.

7. The mold according to claim 1, wherein
(1) the matrix plastic is selected from the group consisting of polyacrylates and polymethacrylates, and the core of the plastic particles comprises aromatic groups and has a refractive index of greater than 1.57; or
(2) the matrix plastic comprises aromatic groups and is selected from the group consisting of polystyrenes, polycarbonates and polyesters, and the core of the plastic particles has a refractive index of less than 1.50.

8. The mold according to claim 1, wherein the proportion of the plastic particles, based on the matrix plastic, is 0.001 to 0.2% by weight.

9. The mold according to claim 1, wherein the mold wall has a thickness in the range of 1 to 50 mm, and/or wherein the inner volume accommodates a spherical sub-volume with a diameter of at least 1 cm.

10. The mold according to claim 1, wherein the UV radiation deflecting particles have a total scattering cross section of at least 1% of a corresponding cross-sectional area of the mold wall.

11. The mold according to claim 1, wherein the mold wall has a linearly extending UV light source connection region for attaching a UV light source thereto, such that UV-rays which penetrate into the mold wall from the UV light source propagate through the mold wall to the inner volume which is enclosed by the mold wall and irradiate the inner volume anisotropically.

12. The mold according to claim 1, wherein the size of said UV radiation deflecting particles is in a range from 5 to 55 µm.

13. The mold according to claim 1, wherein the total mass of said UV radiation deflecting particles is less than 5% by weight of the polymer.

14. The mold according to claim 1, wherein the total mass of said UV radiation deflecting particles is from 0.25% to less than 5% by weight of the polymer.

15. The mold according to claim 1, wherein said UV radiation deflecting particles further comprise aluminum or stainless steel.

16. The mold according to claim 1, wherein said UV radiation deflecting particles further comprise magnesium oxide, alumina or silica.

17. The mold according to claim 1, wherein said UV radiation deflecting particles further comprise a halogenide of an element of groups I, II or III of the periodic table of elements.

18. The mold according to claim 1, wherein said UV radiation deflecting particles further comprise a fluoride of an element of groups I, II or III of the periodic table of elements.

19. The mold according to claim 1, wherein said UV radiation deflecting particles further comprise $CaF_2$, $MgF_2$ or LiF.

20. The mold according to claim 1, wherein the UV radiation deflecting particles have a total scattering cross section of at least 10% of a corresponding cross-sectional area of the mold wall.

21. The mold according to claim 1, wherein the mold wall has a linearly extending UV light source connection region for attaching a UV light source thereto, such that UV-rays which penetrate into the mold wall from the UV light source propagate through the mold wall to the inner volume which is enclosed by the mold wall and irradiate the inner volume anisotropically, with an anisotropy of less than 50%.

22. An apparatus for molding a UV cured article, the apparatus comprising:
   the mold according to claim 11, and
   a UV light source attached to a UV light source connection region of the mold wall.

23. A method of molding a UV cured article, the method comprising:
   providing the mold according to claim 1;
   filling a UV curable mass into the inner volume;
   emitting UV light from a UV light source through the mold wall;
   deflecting the UV light by the UV light deflecting particles;
   irradiating the UV curable mass with the UV light, thereby curing the UV curable mass to become the UV cured article.

24. A method of manufacturing an article, the method comprising:
   providing the mold according to claim 1;
   filling a UV curable mass into the inner volume; and
   irradiating the UV curable mass with a UV light, thereby curing the UV curable mass to become the UV cured article.

25. The method of manufacturing an article according to claim 24, wherein the UV cured article is an electrical insulator.

* * * * *